July 31, 1956 M. GOLDMAN 2,757,237

SYNCHRONIZING CIRCUIT

Filed March 4, 1955 2 Sheets-Sheet 1

INVENTOR,
MAX GOLDMAN.

BY Frederick M. Strader

ATTORNEY.

July 31, 1956 M. GOLDMAN 2,757,237

SYNCHRONIZING CIRCUIT

Filed March 4, 1955 2 Sheets-Sheet 2

INVENTOR,
MAX GOLDMAN
BY Frederick M Strader
ATTORNEY

United States Patent Office 2,757,237

Patented July 31, 1956

2,757,237

SYNCHRONIZING CIRCUIT

Max Goldman, Long Branch, N. J., assignor to the United States of America as represented by the Secretary of the Army Application March 4, 1955, Serial No. 492,325

8 Claims. (Cl. 178—53.1)

(Granted under Title 35, U. S. Code (1952), sec. 266)

The invention described herein may be manufactured and used by or for the Government for governmental purposes, without the payment of any royalty thereon.

This invention relates to synchronizing circuits and more particularly to such circuits for use in Teletype transmission.

The standard Teletype code provides for the maintenance of synchronism between the transmitting and receiving Teletype machines by including the transmission of pulses for synchronization as well as intelligence. However, multipath effects over high frequency radio circuits often cause the mutilation or loss of pulses. Loss of intelligence pulses resulting in one or two errors in received copy is not in itself serious as the sense of a message may not be lost, but loss of synchronizing pulses may cause up to fifteen or more consecutive errors resulting in the obliteration of entire words and requiring retransmission of messages or abandonment of facilities.

The seriousness of loss of synchronism in radio Teletype transmission has led to the use of synchronous systems which are exceedingly complex, degrade performance and result in a much higher channel investment than required by non-synchronous facilities.

Transmission of Teletype intelligence is accomplished by means of combinations of pulses having differing energy characteristics, e. g., a binary system wherein one voltage or current level is called the "mark" and the second the "space." Five intelligence pulses are transmitted in sequence, each pulse consisting of either a mark or space level. This yields a total of $2^5$ or 32 different combinations of pulses, each combination being known as a "frame" to transmit the letters of the alphabet and required machine functions.

Reception of the proper frame requires not only that the receiving device differentiate between the two levels constituting the mark and space characteristics of the code, but also that synchronism be maintained so that the receiving machine can determine which of the five intelligence pulses is being received.

The sending and receiving devices may consist of a series of indented cams on a shaft whose speed is controlled by a synchronous or governed motor. For each intelligence pulse, the indentation of the associated cam is properly placed to operate electrical contacts (transmitting) and to operate a mechanical selecting arrangement (receiving). Assume that the transmitting and receiving mechanisms begins rotating at the same time and that the receiving selector mechanism is set to select at the center of each incoming pulse. Any minute difference in speed between the transmitting and receiving shafts is cumulative. For example, if the receiving device runs .001% slower than the transmitting device, and if the time per frame (one shaft revolution) is 0.1 second, then, after one hour or 36,000 revolutions, the receiving device will be behind the transmitting device by 36,000×.001%=36% of a revolution or character. Since for five units in 0.1 second, each pulse is 0.02 second or 20 milliseconds in duration, the selecting mechanism will be two pulses behind and continually printing errors.

To avoid destructive accumulation of error, the common method for synchronization in present use is the addition of so called synchronizing pulses to the five intelligence pulses which comprise a frame. The "start" synchronizing pulse is of the same energy level as a space pulse, precedes the intelligence pulses, and is of the same duration as each intelligence pulse. The "stop" pulse which follows the intelligence is of the same energy level as a mark pulse and is 1.42 times as long as each intelligence pulse. This code is usually referred to as the start-stop 7.42 unit code.

In using this code, interference and/or multipath effects may result in the loss of both intelligence and synchronizing pulses. Loss of an intelligence pulse may only result in the loss of a single frame but the sense of the word and message probably will not be lost. However, loss of a synchronizing pulse might obliterate an entire word or several words and the sense of a message may be lost entirely.

Accordingly, it is a primary object of the present invention to provide at the receiver an apparatus for automatically inserting artificial start and stop pulses electronically in a binary code system at the proper intervals whether or not such pulses are being received.

Another object is to provide such a system wherein such artificial pulses are inserted only when intelligence is being received by a receiving machine.

In accordance with the present invention, there is provided in a system utilizing a binary code wherein the total duration of each transmitted frame comprises a combination of a chosen number of intelligence pulses of differing characteristics, each frame including a start pulse of one characteristic and a stop pulse of another characteristic, an apparatus for inserting at the receiver artificial start and stop pulses respectively synchronous with and substantially equal in duration to the transmitted start and stop pulses, comprising means for generating a first asymmetric square wave, each cycle of which has substantially said total duration, each cycle including a portion substantially synchronous with and equal in duration to the transmitted start pulse, means for triggering the first asymmetric wave generating means in accordance with the leading edge of the transmitted start pulse, means for generating a second asymmetric wave, each cycle of which has said total duration, each cycle including a portion substantially synchronous with and equal in duration to a transmitted stop pulse, means for triggering the second wave generating means in accordance with the leading edges of the first asymmetric wave, and means for combining the transmitted frame and the first and second asymmetric waves whereby it is assured that each frame includes a start pulse having one of said characteristics and a stop pulse having another of said characteristics.

For a better understanding of the present invention together with other and further objects thereof, reference is had to the following description taken in connection with the accompanying drawings, and its scope will be pointed out in the appended claims.

In the drawings, Fig. 1 is a block diagram of the artificial pulse insertion apparatus in accordance with the invention;

Figure 2:
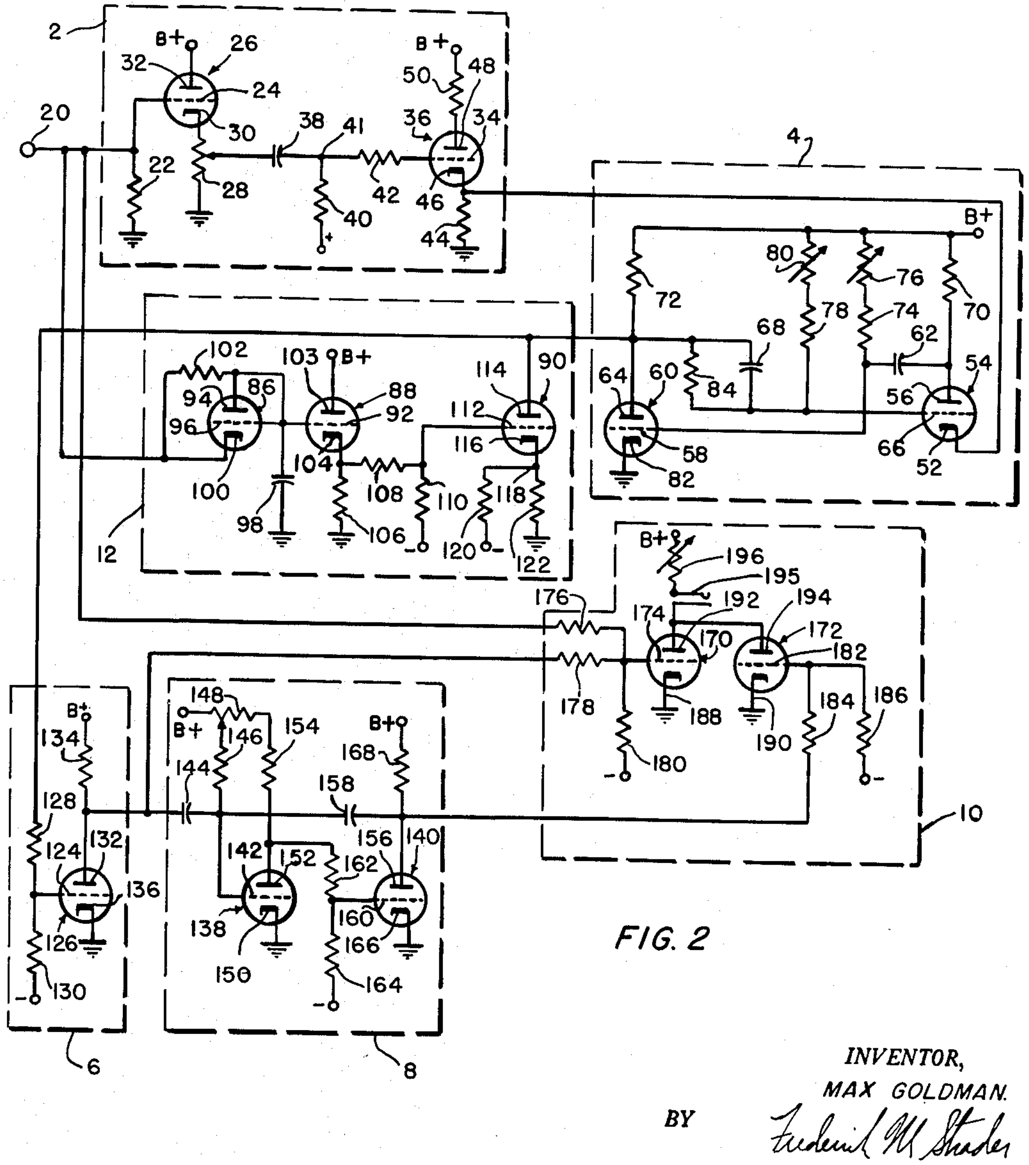
Fig. 2 illustrates the detailed circuits of the apparatus of Fig. 1.
Figure 3:
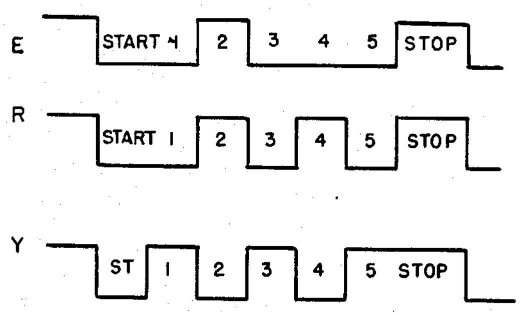
Fig. 3 is a representation of Teletype frames transmitted in binary code.
Figure 4:
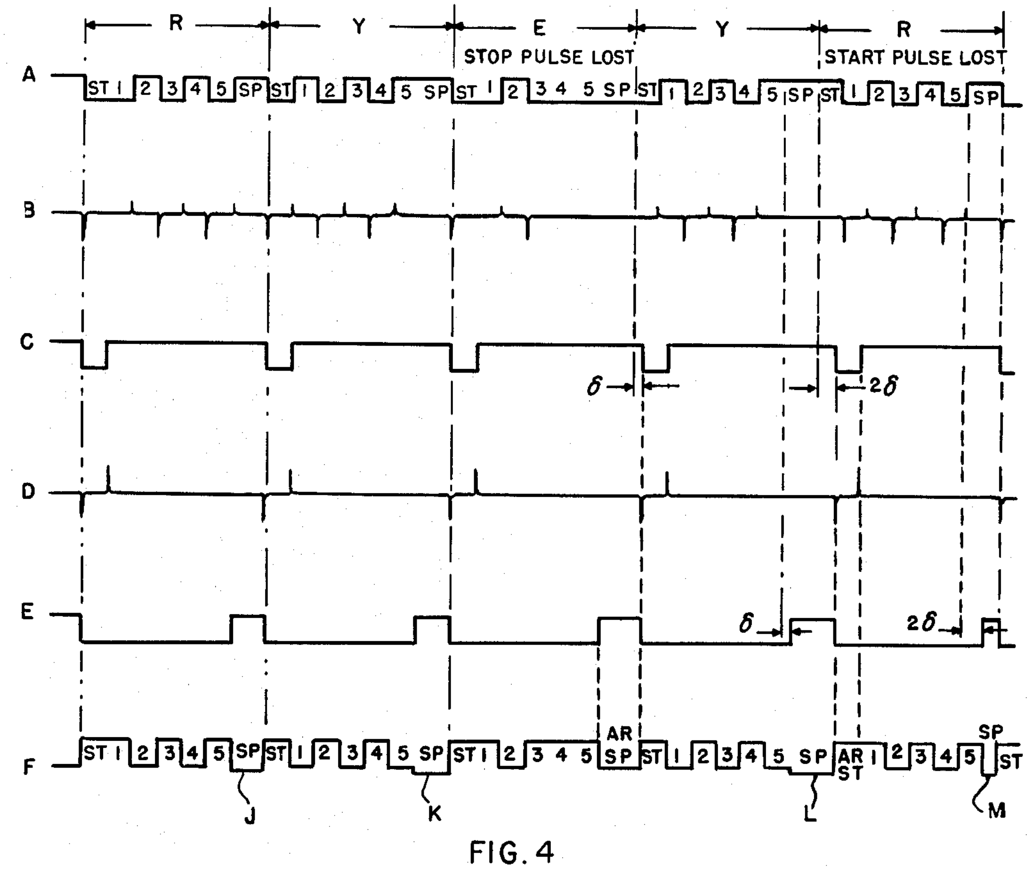

Fig. 4 includes a series of graphs utilizing the characters of Fig. 3 to explain the operation of the Fig. 2 arrangement.

Figure 1:
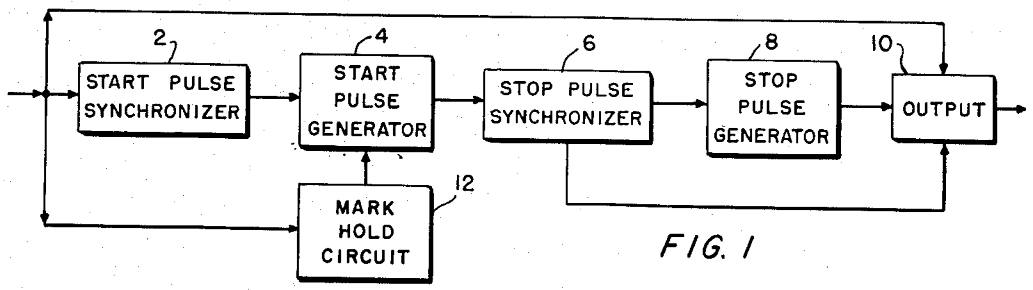

Referring now to Fig. 1, there is shown an apparatus for periodically inserting artificial start and stop pulses in synchronism with transmitted start and stop pulses. The apparatus includes a start pulse synchronizer 2 for differentiating each incoming pulse and for clipping the positive portion of each pulse. In the present system, it is assumed that the two characteristics of pulses that are utilized are one having a voltage level of zero and constituting a space pulse and a predetermined positive voltage which constitutes a mark pulse. It is to be understood that these voltages are arbitrary. They may both be of differing positive or negative levels or combinations thereof. Thus, a start pulse commencing a frame is at a zero voltage and a stop pulse ending a frame is at a chosen positive voltage. The leading edge of the differentiated start pulse is utilized to trigger an artificial start pulse generator 4. Generator 4 is an astable (or free-running) multivibrator which produces a first asymmetric wave, each cycle thereof having a duration substantially equal to the duration of a transmitted frame such as shown in Fig. 3, the wave consisting of a leading positive portion substantially synchronous with and of substantially equal duration to the transmitted start pulse and a second and a trailing negative portion having a duration equal to the remainder of the frame.

The output of start pulse generator 4 is applied to a start pulse synchronizer 6 wherein the wave generated by start pulse generator 4 is inverted and differentiated. The leading edge of this inverted wave is utilized to trigger a stop pulse generator 8 which is a monostable (or one-shot) multivibrator, stop pulse generator 8 producing a second asymmetric wave also having a total duration substantially equal to the duration of the transmitted frame and consisting of a leading negative portion and a trailing positive portion substantially synchronous with and equal in duration to a transmitted stop pulse. The incoming frame, the inverted first asymmetric wave and the second asymmetric wave are combined by an output stage 10 which produces an output wherein the incoming frame is inverted and wherein there is always present a positive start pulse at the beginning of a character and a zero voltage stop pulse.

Since between transmissions of Teletype messages, a steady mark pulse is transmitted, the permission of start pulse generator 4 to run free would result in a steady generation of pulses which would cause erratic operation of the machine. To disable start pulse generator 4 if a "space" pulse is not received for a chosen amount of time, a mark hold circuit 12 is provided. The first incoming start pulse deactivates the mark hold circuit 12, permitting start pulse generator 4 to operate.

Reference is now made to Fig. 2 wherein the circuit diagram for the system of Fig. 1 is shown in detail. Start pulse synchronizer 2 comprises a first cathode follower stage which provides isolation from the circuit, an RC circuit for differentiating the output from the first stage and a second cathode follower stage which clips the positive portion of each differentiated pulse. The incoming signal from terminal 20 which provides a chosen positive voltage on mark, and zero voltage on space is developed across a grid resistor 22 and applied to the grid 24 of the vacuum tube 26 of the first cathode follower stage. A cathode potentiometer 28 connected between the cathode 30 and ground controls the level of the output of this stage. The plate 32 is connected to a B+ source of potential. The output of tube 26 is applied to the grid 34 of vacuum tube 36 of the second cathode follower stage through a differentiating circuit comprising a capacitor 38 and a resistor 40 which is connected to a source of positive potential. To limit the current drawn by grid 34 of tube 36 and to provide proper bias for grid 34 when tube 36 is in the quiescent state, a resistor 42 is provided between the end 41 of resistor 40, and grid 34, resistors 40 and 42 being so chosen that zero bias is present on grid 34 when no signal is applied thereto. Due to the grid limiting effect of resistor 42, the amplitude of a positive pulse output of tube 34 is sharply reduced relative to a negative output pulse from said tube. A cathode load resistor 44 is connected between the cathode 46 of tube 36 and ground, and the plate 48 is connected to B+ through a resistor 50.

The sharp negative going output pulse from tube 36 is used to lock in start pulse generator 4 which is a conventional plate to grid coupled astable multivibrator that provides an asymmetric square wave. The output of tube 36 is connected directly to the cathode 52 of a vacuum tube 54. Plate 56 is coupled to the grid 58 of a vacuum tube 60 through a capacitor 62 and the plate 64 of vacuum tube 60 is coupled to the grid 66 of tube 54 through a capacitor 68. Plates 56 and 64 are connected to B+ through resistors 70 and 72 respectively. Grid 58 is connected to B+ through series connected resistor 74 and variable resistor 76. Grid 66 is connected to B+ through series connected resistor 78 and variable resistor 80. Variation of resistor 76 varies the duration of the positive portion of each cycle, and variataion of resistor 80 varies the operating frequency. Cathode 82 is connected to ground. A resistor 84 shunted by capacitor 68 is connected between plate 64 and grid 66 to insure that grid 66 is normally biased negative with respect to cathode 52.

When start pulse generator 4 is in the quiescent state, tube 54 is non-conductive. Except when mark hold circuit 12 is operating as explained further herein below, tube 60 is conducting. Upon application of the negative pulse from cathode 46 to cathode 52, tube 54 is rendered conductive, tube 60 is cut off, and the voltage at plate 64 rises to the B+ voltage, causing the first artificial start pulse to be generated, it being the first and smaller positive portion of an asymmetric square wave, as shown in curve C of Fig. 4. Tube 60 remains cut off for a period of time determined by the time constant of capacitor 62, resistor 74 and resistor 76. When tube 60 begins to conduct, tube 54 is rendered nonconductive for a time duration fixed by capacitor 68, resistor 78 and resistor 80. It is necessary, as will be explained, to adjust resistor 80 so that tube 54 will commence conducting slightly after the stop to start transition of the next incoming frame.

Between transmissions of Teletype intelligence, a steady mark or predetermined positive voltage is present at the input of tube 26. As set forth above, if start pulse generator 4 were allowed to run free, artificial start pulses would be periodically generated and causing erratic operation. Mark hold circuit 12 is accordingly provided to idle start pulse generator 4 if a space signal is not received from the Teletype transmitter for a specified amount of time, such as, for example, the duration of two or more frames. The first incoming space signal (the start pulse of the first received frame) deactivates the mark hold circuit 12 and permits start pulse generator 4 to operate.

Mark hold circuit 12 consists of vacuum tubes 86, 88 and 90 and associated circuits. The input signal developed across resistor 22 is applied to the grid 92 of vacuum tube 88 through triode tube 86 connected to operate as a diode. Plate 94 of tube 86 is tied to grid 96, which is in turn connected to ground through a capacitor 98. Cathode 100 is connected to plate 94 through resistor 102. It will be seen that if a steady positive or mark pulse is applied to cathode 100, tube 86 will be rendered nonconductive as cathode 100 goes positive with respect to plate 94. As a consequence, capacitor 98 charges, causing the grid 92 of tube 88 to go positive resulting in the application of a positive output from cathode 104 to the grid 112 of vacuum tube 90. Tube 90 is normally at cutoff, grid 112 being biased sufficiently negative by the combination of a resistor 106 connected between cathode 104 and ground, grid resistor 108 connected between grid 112 and cathode 104 and resistor 110 connected between grid 112 and a source of negative potential. Plate 103 is connected directly to B+. Plate 114 of tube 90 is tied to plate 64 of tube 60. The output across cathode resistor 106 causes grid 112 to go positive and tube 90 is rendered conductive.

Since the cathode 116 of tube 90 is biased negative through its connection to the junction point 118 of a resistor 120, connected to a negative potential source, and a resistor 122, connected to ground, plate 114 is driven negative when tube 90 conducts and consequently plate 64 which is tied to plate 114 goes negative rendering tube 60 non-conductive, thus disabling start pulse generator 4. Now, upon receipt of the first incoming start pulse, which is at zero voltage, diode connected tube 86 conducts. Consequently, a rapid discharge path is provided for capacitor 98 through tube 86 and resistor 22 to ground, causing a decrease in positive voltage at grid 92 and consequently at grid 112. Tube 90 is thus rapidly cut off, whereupon plate 114 goes positive permitting plate 64 also to go positive so that start pulse generator becomes operative. The values for capacitor 98 and resistor 102 may be so chosen that if an incoming space pulse, is not received for a duration equal to a chosen number of frames at a given word per minute rate, mark hold circuit 12 will cut off start pulse pulse generator 4.

The stop pulse synchronization circuit 6 inverts and couples the artificial positive start pulse generated at plate 64 of tube 60 to the stop pulse generator 8 and to the output stage 10. The output of plates 64 is coupled to the grid 124 of a vacuum tube 126 through a resistor 128, grid 124 also being connected to a source of negative potential through a resistor 130, resistors 128 and 130 being so chosen that tube 126 is normally non-conductive. Plate 132 is connected to B+ through a resistor 134 and cathode 136 is connected to ground.

The stop pulse generator 8 is a plate to grid coupled monovibrator which produces an asymmetric wave when triggered and comprises vacuum tubes 138 and 140 and their associated circuits. The output from tube 126 is applied to the grid 142 of tube 138 through a capacitor 144, grid 142 being connected to B+ through a series combination of resistor 146 and an adjustable resistor 148. Cathode 150 is connected to ground, and plate 152 is connected to B+ through resistors 154 and 148. Grid 142 is also coupled to the plate 156 of tube 140 through a capacitor 158. Plate 152 of tube 134 is connected to the grid 160 of tube 140 through a resistor 162, grid 160 also being connected to a source of negative potential through resistor 164. Tube 138 is normally in the conducting state and resistors 162 and 164 are so chosen that tube 140 is normally non-conductive. Cathode 166 is connected to ground, and plate 156 is connected to B+ through a resistor 168. The artificial start pulse generated at plate 64 and inverted by stop pulse synchronizer 6 is differentiated by capacitor 144. The sharp negative pulse created by the leading edge of the differentiated pulse is applied to grid 142 and renders tube 138 non-conductive. The voltage of plate 152 consequently rises permitting grid 160 to go positive so that tube 140 is rendered conductive, thereby causing a drop in voltage at plate 156, and thus driving grid 142 negative through capacitor 158. The voltage at grid 142 slowly rises as capacitor 158 charges at a rate determined by the time constant of capacitor 158 and resistors 146 and 148. As the voltage at grid 142 rises above cutoff so that tube 138 again conducts, there results a consequent decrease in voltage at plate 152 and grid 142 so that tube 140 is rendered non-conductive and the stable condition of the monovibrator restored. The stable condition exists until the next incoming negative pulse reinitiates the monovibrator cycle. The artificial stop pulse which is the positive second and smaller portion of each cycle of the wave shown in curve E of Fig. 4 is created at plate 156. Resistor 148 is adjustable so that the incidence of the stop pulse created at plate 156 coincides with the correct arrival of the transmitted stop or mark pulse. As described earlier, the mark pulse occurs 6 pulse widths after the beginning of the start pulse.

Output circuit 10 consists of vacuum tubes 170 and 172 and their associated circuits. The incoming signal from input terminal 20 is applied to the grid 174 of tube 170 through resistor 176. The output from stop pulse synchronizer 6 is applied to the grid 174 through a resistor 178. Grid 174 is connected to a source of negative potential through a resistor 180 so that resistors 176 and 180 effectively function as a negative divider which adds the incoming signal and the output of stop pulse synchronizing circuit 6, the addition being the input to grid 174. Resistors 176, 178 and 180 are so chosen that tube 170 is quiescent except when an artificial start pulse occurs. The artificial stop pulse generated at plate 156 is applied to the grid 182 of tube 172 through a resistor 184, grid 182 also being connected to a source of negative potential, through a resistor 186, resistors 184 and 186 being so chosen that tube 172 is normally non-conductive. Cathodes 188 and 190 are connected to ground and plates 192 and 194 are tied together and in turn connected to a B+ source through a series connected output jack 195 and a variable resistor 196. It is to be seen that whether the incoming pulse from terminal 20 is positive or negative, the leading portion of the output of asymmetric square wave stop pulse synchronizer 6 is always negative so that during the space interval when a start pulse should be received, tube 170 remains quiescent. In a similar manner, the trailing portion of the asymmetric square wave output of stop pulse generator 8 at plate 156 is always positive so during that time interval when a stop or mark pulse should be received, whether the incoming signal is at a positive or zero voltage, the input to grid 182 of tube 172 is positive, so tube 172 is rendered conductive and an output is produced from output stage 10. Resistor 196 is adjustable so that a desired current may be supplied to the load when either tube 170 or tube 172 conducts. It is, therefore, to be noted that the output will always space during the time interval of an artificial start pulse and mark during an artificial stop pulse. Since at least one tube will conduct during a stop or mark pulse, the plate voltage in stage 10 will be lower than during a space pulse when both tubes 170 and 172 are quiescent. When the artificial stop pulse output from plate 156 and the incoming stop pulse superimpose, the plate voltage in stage 10 will be the least due to the fact that slightly more plate current is provided when both tubes 170 and 172 conduct simultaneously.

The graphs of Fig. 4 illustrate the operation of the apparatus described. In this figure, graph A shows the incoming frames of Fig. 3. The first two incoming frames "R" and "Y" are normal. The third frame "E" does not contain the stop pulse. The fifth frame "R" has lost the start pulse. Curve B represents the clipped differentiated output from start pulse synchronizer 2 which is used to trigger start pulse generator 4. Curve C shows the output at plate 132 of tube 126. It is seen that the first and smaller portion of the asymmetric square wave output from generator 4 is synchronous with, equal in duration and opposite in polarity to the first transmitted start pulse in curve A. Curve D represents the differentiated output from plate 132 of tube 126 in stop pulse synchronizer 6 which is applied to trigger stop pulse generator 8. Curve E represents the output from plate 156. Curve F shows the output from stage 10, the output being the result of combining the output of plate 132 of tube 126, the output of plate 156 of tube 140 and the incoming transmitted character at 20.

It is seen from curve F that stop pulse generator 8 will insert a stop pulse into the output curve F for the third frame "E," However as shown in curve A, when synchronism is lost because of the absence of the stop pulse in the third letter "E," there is no negative stop to start transition to trigger start pulse generator 4 at the end of the stop pulse. The free running frequency of start pulse generator 4 is made to be of slightly greater duration than the duration of a frame, such difference in duration being represented in Fig. 4 by $\delta$. The ensuing artificial stop pulse as shown in curve C is also delayed by a period δ. The fifth character "R" has lost the start pulse. Again there is no start to stop transition to trigger start pulse generator 4. Now, it is seen that the next artificial start and stop pulses are delayed for a period equal to 2δ from their normal positions. In curve F, we see the effects of such delay when the artificial pulses are superimposed on the incoming characters. Now, assuming that the stop to start transition of a sixth character (not shown) occurs at the normal position, it will trigger the start pulse generator and operation is again back to normal. Thus, where synchronism would have been definitely lost in two cases, the artificial stop and start pulse generators are inserted the missing synchronizing pulses and the teletype receiver will have remained in synchronism with the transmitting device. Of course the output in curve F is the inverse of the incoming characters in curve A so that the polarities are inversed. Points J, K, L and M of curve F are at a lower voltage than the remainder of the output due to the fact that an artificial positive stop pulse is superimposed over an incoming positive stop pulse so that at that time, the plate output from stage 10 is the least.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a system utilizing a binary code wherein the total duration of each transmitted frame comprises a combination of a chosen number of intelligence pulses of differing characteristics, each frame including a start pulse of one characteristic and a stop pulse of another characteristic, an apparatus for inserting at the receiver artificial start and stop pulses respectively synchronous with and substantially equal in duration to said transmitted pulses, comprising means for generating a first asymmetric square wave, each cycle of which has substantially said total duration, said cycle including a portion substantially synchronous with and equal in duration to said transmitted start pulse, means for triggering said first asymmetric wave generating means in accordance with the leading edge of said transmitted start pulse, means for generating a second asymmetric square wave each cycle of which has substantially said total duration, each cycle including a portion substantially synchronous with and equal in duration to said transmitted stop pulse, means for triggering said second wave generating means in accordance with the leading edge of said first asymmetric wave, and means for combining said transmitted frame, and said first and second asymmetric waves whereby it is assured that each frame includes a start pulse having one of said characteristics and a stop pulse having another of said characteristics.

2. In a system as defined in claim 1, said means for generating said first asymmetric wave comprising an astable plate to grid coupled multivibrator having an adjustable running frequency.

3. In a system as defined in claim 1, said means for generating said second asymmetric wave comprising a monostable multivibrator.

4. In a sysem as defined in claim 1, said means for triggering said first asymmetric generating means comprising means for differentiating a transmitted frame and means for clipping the positive portions of said differentiated frame.

5. In a system as defined in claim 1, said means for triggering said second asymmetric wave generating means comprising means for differentiating said first asymmetric wave.

6. In a system as defined in claim 5, further including means for inverting said first asymmetric wave.

7. In a system as defined in claim 1, further including means for idling said first asymmetric wave generating means when an incoming wave has a given characteristic and has a duration greater than a plurality of said total durations.

8. In a teletype system utilizing a binary code wherein the total duration of each transmitted frame comprises a combination of a chosen number of intelligence pulses preceded by a start pulse of negative polarity and followed by a stop pulse of positive polarity, an apparatus for inserting artificial start and stop pulses respectively synchronous with and substantially equal in duration to said transmitted start and stop pulses, comprising means for generating an asymmetric square wave, each cycle of which has substantially said total duration, said cycle including a leading portion of positive polarity substantially synchronous with and equal in duration to said transmitted start pulse, means for triggering said first wave generating means in accordance with he leading edge of a transmitted start pulse, means for generating a second asymmetric wave, each cycle of which has substantially said total duration, said cycle including a trailing portion of positive polarity substantially synchronous with and equal in duration to said transmitted stop pulse, means for inverting said first asymmetric wave, means for differentiating said inverted first asymmetric wave to trigger said second asymmetric wave generating means, the latter being triggered in accordance with the leading edge of said differentiated inverted first asymmetric wave, means for idling said first asymmetric wave generating means when the duration of a positive transmitted pulse is greater than a plurality of said total durations and means for combining said transmitted character, and said first and second asymmetric waves whereby an inverted frame is provided immediately preceded by a start pulse of positive polarity and followed by a stop pulse of negative polarity.

References Cited in the file of this patent

UNITED STATES PATENTS

| | | |
|---|---|---|
| 2,292,944 | Hudec | Aug. 11, 1942 |
| 2,478,922 | Hitchcock | Aug. 16, 1949 |